April 10, 1951  O. FITZ SIMONS  2,548,298

PRESSURE RELIEF DEVICE

Filed July 24, 1946

INVENTOR
OGDEN FITZ SIMONS.
BY Reuben Schmidt
ATTORNEY

Patented Apr. 10, 1951

2,548,298

UNITED STATES PATENT OFFICE 2,548,298

PRESSURE-RELIEF DEVICE

Ogden Fitz Simons, Webster Groves, Mo., assignor to Monsanto Chemical Company, St. Louis, Mo., a corporation of Delaware Application July 24, 1946, Serial No. 685,961

1 Claim. (Cl. 220—89)

This invention relates to rupture discs for use in reaction kettles or in other places where sudden surges of pressure must be quickly vented. More particularly, the invention relates to inexpensive rupture discs and methods for regulating the strength of the discs.

Rupture discs or explosion discs are used in reaction vessels to relieve sudden pressure surges which might cause serious damage if they were not quickly dissipated. Various materials have been used for making these discs such as metals including iron, steel, lead, silver, platinum and gold. The type of material used depends partly on the reactants in the reaction chamber. For example, if the pressure is exerted by an inert gas such as nitrogen, the material of the rupture disc is unimportant, but if it is steam or a corrosive liquid or gas, great care must be taken in selecting the material of the rupture disc to prevent contamination of the material in the reaction chamber.

Attempts have been made in the past to use glass for rupture discs because of its relatively great resistance to most chemicals but no method has been found which will allow reasonably accurate control of the rupture point of glass discs. Thus, when glass discs were used, the rupture point varied between 10 and 100 pounds per square inch for apparently similar discs.

It is an object of this invention to provide glass rupture discs. A further object of this invention is to provide glass rupture discs which will break within a relatively narrow pressure range.

These and other objects are attained by using for a rupture disc, glass at least one surface of which has been roughened by sand blasting, grinding or etching. By careful selection of the thickness of the glass to be used in the discs and by controlling the nature of the roughened surface relatively accurate control of the bursting point is attained.

This invention is more clearly disclosed by reference to the drawings in which

Figure 1:
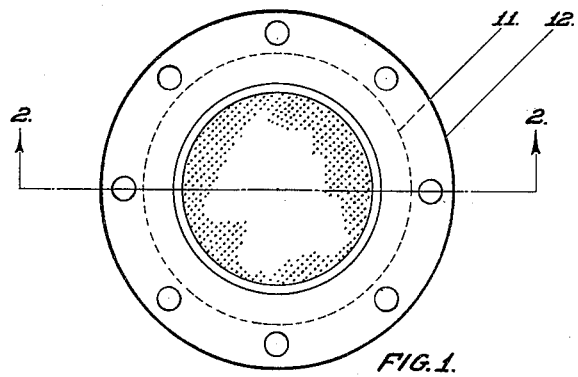
Fig. 1 is a top plan view of a glass rupture disc set within a flange.
Figure 2:
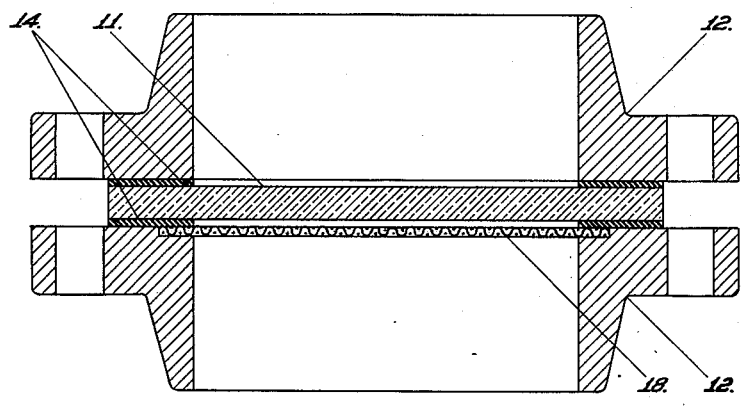
Fig. 2 is an enlarged cross-section taken along lines 2—2 in Fig. 1 looking in the direction of the arrows.

In Figs. 1 and 2 there is shown a method for assembling glass rupture discs in an explosion vent on a suitable reaction vessel, not shown. The glass rupture disc 11 is sealed within a flange of a vent pipe, 12, using gaskets, 14, to seal the glass to the flanges and to prevent breaking the glass when the flanges are tightened. The smooth surfaces 16 at the edges of the upper and lower faces of the discs serve to give a leak-proof seal with the gaskets.

Figure 4:
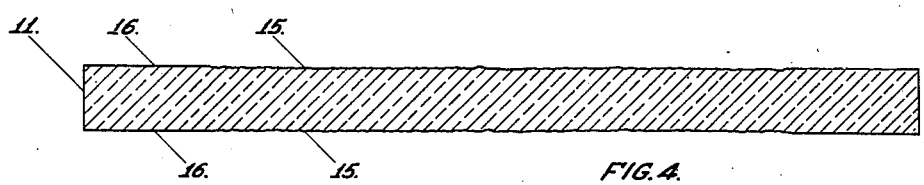
Fig. 4 is an enlarged cross-section of an alternate type of glass rupture disc.

The glass rupture disc 11 has a roughened surface 15. This surface may be obtained by sand blasting, grinding, or by etching or by other known means for producing a fine pebbly or grainy surface on glass. Preferably, the roughened surface covers only that portion of the glass which is subject to rupture from pressure surges in the reactor and may be carried on only the surface of the glass rupture disc facing the low pressure side of the system. However, as shown in Fig. 4, both faces of the rupture disc may carry roughened portions, if desired, to give somewhat better control of the critical rupturing point. The smooth polished portions 16 give a good seal as already pointed out.

Figure 3:
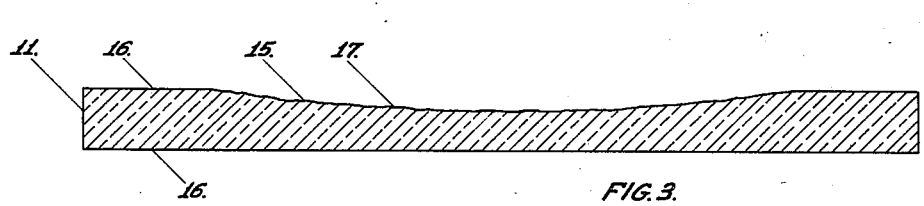
Fig. 3 is an enlarged cross-section of the preferred type of glass rupture disc.

In the embodiment shown in Fig. 3, one surface of disc 11 is sand blasted so that portion 15 is concave, providing a point 17 in about the center of the disc which is thinner than the original glass by a measured amount. For purposes of illustration, the concave portion is greatly exaggerated in Fig. 3. This concave surface is a means for increasing the control over the pressure at which the disc will rupture by changing the thickness of the original glass to meet the specific pressure requirements and then roughening the surface by sand blasting or etching. A rupture disc is thus obtained which will burst at approximately the desired pressure without failure at lower pressures.

It was found convenient, but not essential, to insert a stainless steel or other suitable screen 18 between the kettle and the rupture disc to prevent large pieces of ruptured glass from falling into the kettle.

Fig. 4 shows another rupture disc in which both top and bottom carry sand blasted portions which are substantially flat.

As typical of the rupture characteristics of the glass explosion discs of this invention, a number of circular pieces of plate glass $\frac{5}{32}$ inch thick and 6 inches in diameter were sand blasted on one side. The sand blasted portion covered a circular area in the center of the disc approximately 4 inches in diameter. The sand blasting had been carried out to produce a concave surface the central point of which was about .015 inch thinner than the original plate. These discs were used in the pressure relief vent of a reaction kettle in which the pressure was provided by hydrogen chloride. The thickness of the glass of the sand blasted area was chosen to provide a bursting point of 15 pounds per square inch. Three of the plates were broken under controlled conditions and were found to burst at approximately 14, 15 and 17 pounds per square inch. Thereafter, similar discs were used in regular production units and no failures at too low or too high a pressure were observed.

The thickness of the glass may be varied to obtain different bursting points. For example, by reducing the thickness to ⅛ inch the bursting point was reduced to about 12 p. s. i. For higher bursting pressure, thickness up to ½ inch may be used.

The glass rupture plates of this invention have the advantage that they are relatively cheap and it is easy to regulate their bursting point. Furthermore, they are not attacked by corrosive liquids and gases and therefore will not contaminate the reaction if pieces of the plates fell into the reaction vessel.

It is obvious that many variations can be made in the products and processes of this invention without deviating from its spirit and scope as set forth in the appended claim.

What is claimed is:

An explosion protector for reaction vessels, comprising flanges and a glass rupture disc sealed in gas-tight relationship between said flanges, said disc comprising plate glass of which at least one flat surface carries a central concave finely roughened portion.

OGDEN FITZ SIMONS.

REFERENCES CITED

The following references are of record in the file of this patent:

UNITED STATES PATENTS

| Number | Name | Date |
|--------|------|------|
| 540,419 | Burlingame | June 4, 1895 |
| 833,694 | Parker | Oct. 16, 1906 |
| 1,240,398 | Wood | Sept. 18, 1917 |
| 1,429,296 | Obert | Sept. 19, 1922 |
| 1,556,796 | Minter | Oct. 13, 1925 |
| 1,565,869 | Straw | Dec. 15, 1925 |
| 2,143,796 | Phillips | Jan. 10, 1939 |
| 2,178,178 | McKeever | Oct. 31, 1939 |
| 2,261,035 | Miller | Oct. 28, 1941 |
| 2,398,708 | Hendrix | Apr. 16, 1946 |

OTHER REFERENCES

"Sand Blasting and How It is Done," on page 26 of Pottery and Glassware Reporter, dated December 29, 1887. (A copy of this article may be found in Div. 67, class 41, subclass 39.)